United States Patent
Ott et al.

(10) Patent No.: US 10,118,527 B2
(45) Date of Patent: Nov. 6, 2018

(54) PARTITION-PROVIDING APPARATUS FOR USE WITH A SEATING REGION OF A SEAT

(71) Applicants: Roderick Lavon Ott, Alexander, AR (US); Reginald Lamar Todd, Cedar Hill, TX (US)

(72) Inventors: Roderick Lavon Ott, Alexander, AR (US); Reginald Lamar Todd, Cedar Hill, TX (US)

( * ) Notice: Subject to any disclaimer, the term of this patent is extended or adjusted under 35 U.S.C. 154(b) by 0 days.

(21) Appl. No.: 15/530,946

(22) Filed: Mar. 28, 2017

(65) Prior Publication Data
US 2018/0281637 A1 Oct. 4, 2018

(51) Int. Cl.
*A47D 15/00* (2006.01)
*B60N 2/90* (2018.01)
*B60N 2/882* (2018.01)

(52) U.S. Cl.
CPC ............... *B60N 2/90* (2018.02); *B60N 2/882* (2018.02)

(58) Field of Classification Search
CPC .................................. B60N 2/90; B60N 2/882
USPC .......................................................... 297/464
See application file for complete search history.

(56) References Cited

U.S. PATENT DOCUMENTS

| | | | | |
|---|---|---|---|---|
| 4,118,812 A * | 10/1978 | Pangburn | ............. | A47D 15/006 5/513 |
| 4,938,401 A * | 7/1990 | Weisbrodt | ............... | B60R 7/043 108/44 |
| 5,054,837 A * | 10/1991 | Chapman | ................. | B60N 2/28 160/351 |
| 5,123,707 A * | 6/1992 | Wurzell | .................... | B60N 2/90 297/464 |
| 5,255,958 A * | 10/1993 | Frischmann | ............. | B60N 2/28 297/232 |
| 5,560,058 A * | 10/1996 | Smith | ..................... | A47C 21/00 5/513 |
| 5,971,487 A * | 10/1999 | Passehl | .................... | B60N 2/28 297/464 |
| 6,142,574 A * | 11/2000 | Alexander | ............... | B60N 2/91 297/464 |
| 6,260,903 B1 * | 7/2001 | von der Heyde | .... | B60N 2/2821 296/24.46 |
| 8,272,674 B2 * | 9/2012 | Vance | ...................... | B60N 2/91 296/24.46 |
| 8,662,367 B2 * | 3/2014 | Panaro | .................... | B60R 11/00 224/542 |
| 8,714,655 B2 * | 5/2014 | Cahall | ..................... | B60N 2/91 297/464 |
| 9,580,031 B2 * | 2/2017 | Kalis | ........................ | B60N 3/10 |
| 9,956,898 B1 * | 5/2018 | Dellock | .................. | B60N 2/90 |
| 2016/0355109 A1 * | 12/2016 | Geraty | .................... | B60N 2/44 |

* cited by examiner

*Primary Examiner* — Rodney B White
(74) *Attorney, Agent, or Firm* — Michael E. McKee

(57) ABSTRACT

An apparatus for use with a seating region having a seat portion and a back portion includes at least one cushioned body which is securable to components of the seating region of a vehicle, bed, couch or sofa for the purpose of securing the at least one body in a stationary relationship with respect to the seating region or for providing a comfortable surface against which an occupant of the seating region may rest. The apparatus is well-suited for use as a partition between the areas of two adjacent seating regions of a vehicle or between a seating region within which an occupant is seated and an adjacent door of the vehicle.

17 Claims, 4 Drawing Sheets

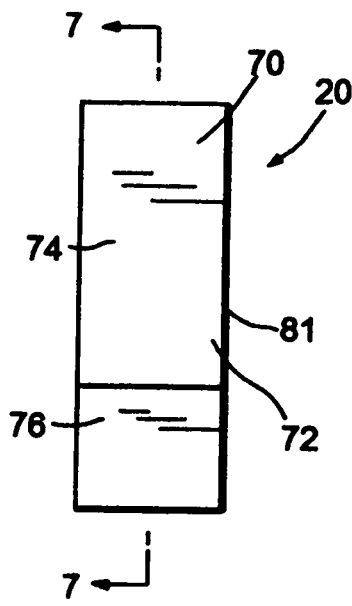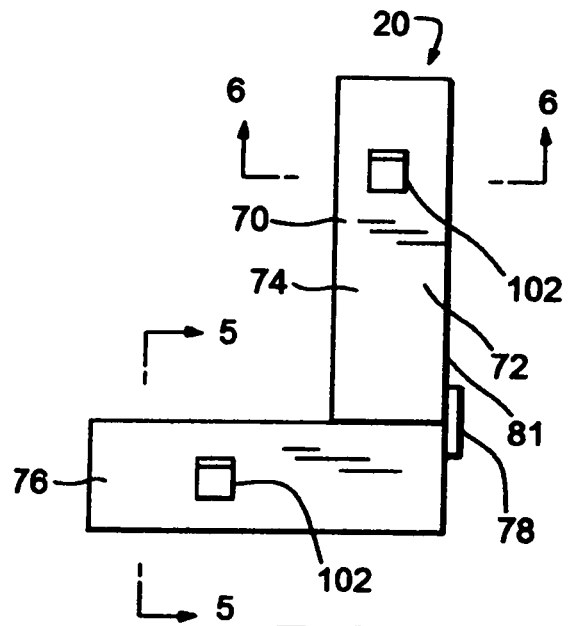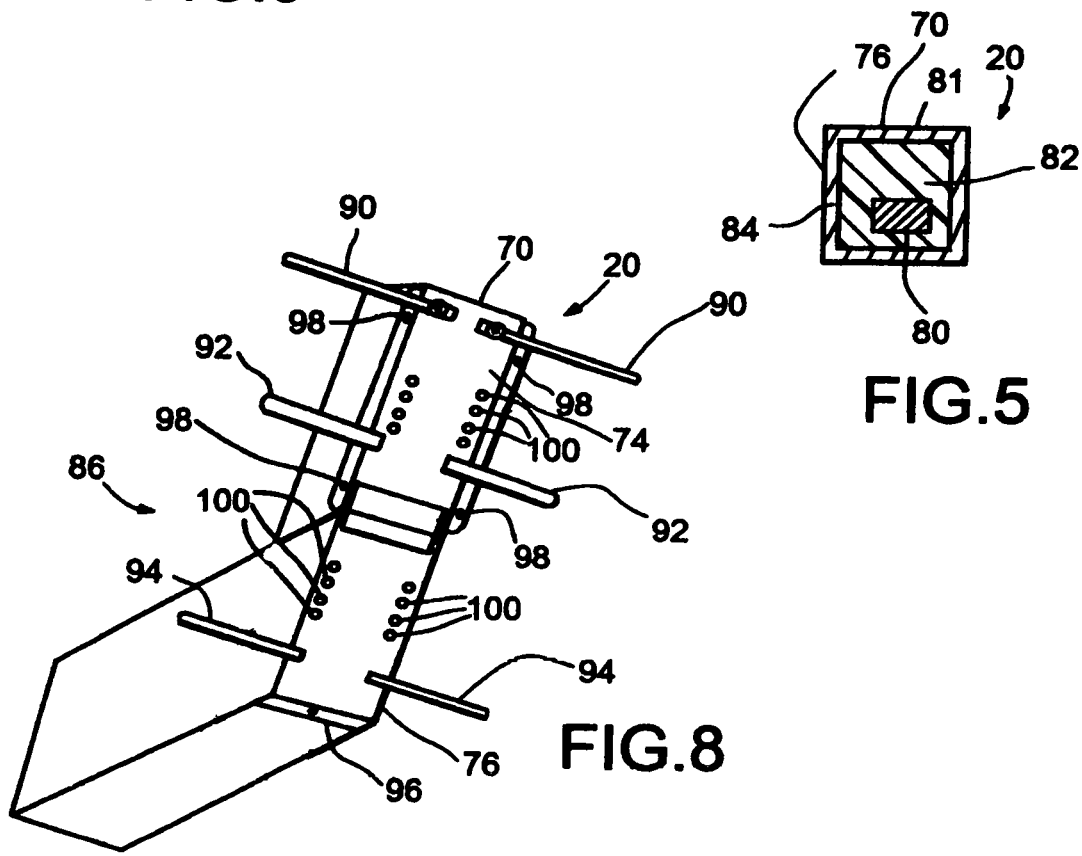

PARTITION-PROVIDING APPARATUS FOR USE WITH A SEATING REGION OF A SEAT

The benefit of Provisional Application Ser. No. 62/390,429, filed Mar. 29, 2016, and entitled PARTITION-PROVIDING APPARATUS FOR USE WITH A SEATING REGION OF A SEAT, is hereby claimed. The disclosure of this referenced provisional patent application is incorporated herein by reference.

BACKGROUND OF THE INVENTION

This invention relates generally to an accessory for use in conjunction with the seating region of a seat, such as may involve the seating region of a vehicle, chair, bed and/or sofa and relates, more particularly, to an accessory which is intended to provide support to an individual seated in the seating region of the seat.

The class of vehicle seats with which this invention is concerned includes a seating region upon which an occupant is positioned in a seated position. Such a seating region includes a seat portion upon which the vehicle occupant is seated and a back portion against which the back of the vehicle occupant is positioned when the occupant is seated upon the seat portion. In some instances, the seating region is disposed adjacent another seating region (as is the case with a bench-type of seat) and in another instance, the seating region is disposed adjacent a door of a vehicle. Moreover, the door of the vehicle may include an accessible latch which is used to open the door or a door lock.

It would be desirable to provide an apparatus or accessory for use with a seating region of a seat which helps to support and confine the head and/or body of the seat occupant within the area of the seating region or which, in the situation in which a door is situated adjacent the seating region, helps to guard against inadvertent access of the latch or lock of an adjacent door by the occupant of the seating region.

Accordingly, it an object of the present invention to provide and new and improved apparatus for securement in a stationary condition with respect to the seating region of a seat and against which the occupant of the seat can lean for support.

Another object of the present invention is to provide such an apparatus for maintaining the head and/or body of the seat occupant within the area of the seating region within which the occupant is seated.

Still another object of the present invention is to provide such an apparatus which, when used in the seating region of a vehicle and a door is disposed adjacent the seating region, helps to guard against inadvertent access of the latch or lock of an adjacent door by the occupant of the seating region.

Yet another object of the present invention is to provide such an apparatus having a portion which is disposed adjacent the seating region to separate the seating region from an adjacent area.

A further object of the present invention is to provide such an apparatus which is securable alongside the seating region of the vehicle seat of the aforementioned class for providing a rest against which the occupant of the seat may lean.

A still further object of the present invention is to provide such an apparatus which is securable in place adjacent one side of the seating region with components which are accessible to componentry of the seating region.

A yet further object of the present invention is to provide such an apparatus which is well-suited for partitioning off one seating region from an adjacent seating region or for partitioning off one seating region from a door which may be positioned adjacent the one seating region.

One more object of the present invention is to provide such an accessory which is capable of being unfolded from a compact arrangement for use and capable of being folded from its condition for use into a compact arrangement for storage.

Still one more object of the present invention is to provide such an apparatus which is uncomplicated in structure, yet effective in operation.

SUMMARY OF THE INVENTION

This invention resides in an apparatus for use with a seating region having a seat portion and a back portion.

The apparatus includes at least one body which is securable in a relatively stationary condition with respect to the seating region for providing a partition adjacent one side of the seating region.

BRIEF DESCRIPTION OF THE DRAWINGS

FIG. 3 is an elevation view of the embodiment of FIG. 1 as seen generally from the front in FIG. 1.

FIG. 4 is an elevation view of the embodiment of FIG. 1 as seen generally from the right in FIG. 3.

FIG. 5 is a cross-sectional view of the embodiment of FIG. 1 taken along line 5-5 of FIG. 4.

FIG. 8 is a perspective view of the embodiment of FIG. 1 shown unfolded to a substantially linear arrangement and depicting the back side, or underside, of the embodiment.

DETAILED DESCRIPTION OF ILLUSTRATIVE EMBODIMENTS

Figure 1:
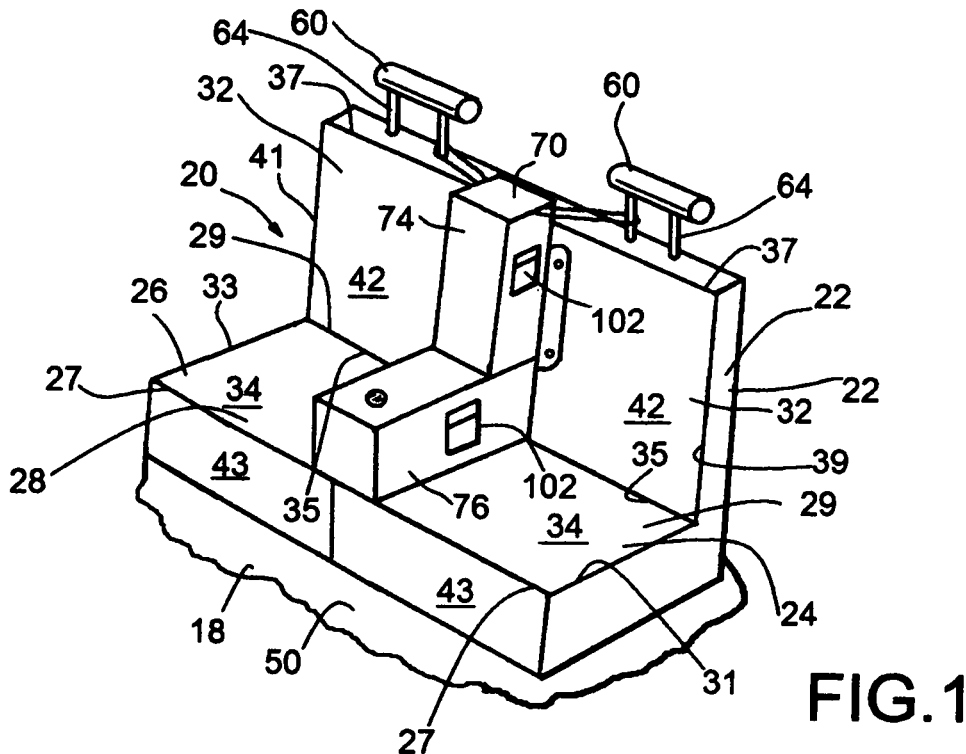
FIG. 1 is a perspective view of an embodiment of an apparatus within which features of the present invention are embodied and shown depicted in an exemplary environment of intended use.
Figure 2:
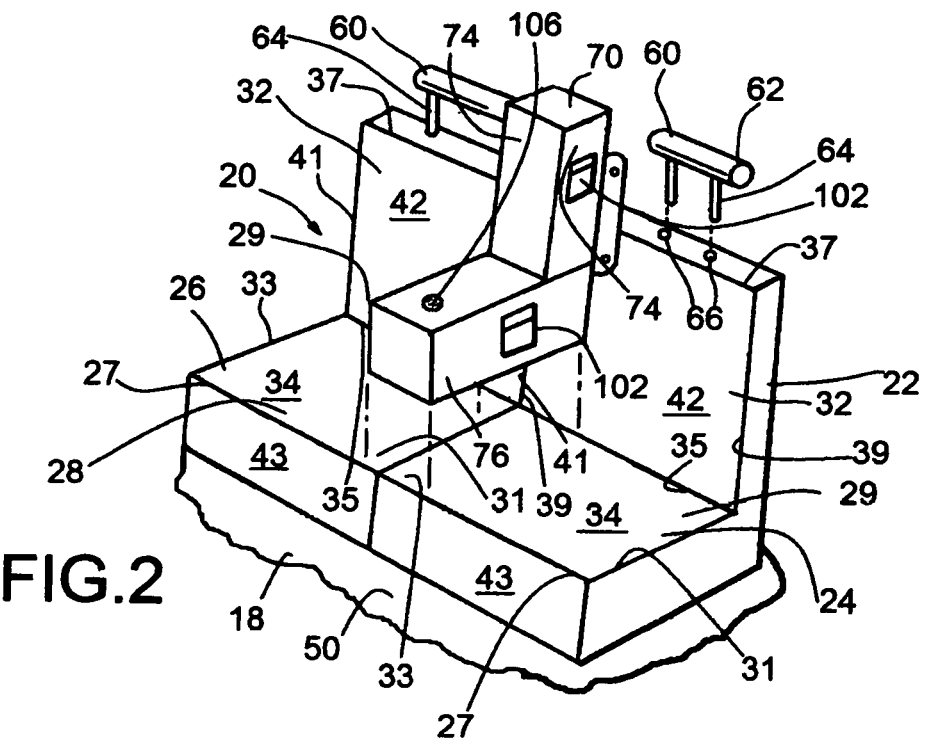
FIG. 2 is a view similar to that of FIG. 1, but shown exploded.

Turning now to the drawings in greater detail and considering first FIGS. 1 and 2, there is illustrated an embodiment, generally indicated 20, of an apparatus, or accessory, within which features of the present invention are embodied and shown utilized in an exemplary environment of intended use. Briefly, the environment of FIGS. 1 and 2 includes a seat 22 (e.g. of a bench-type style) of a vehicle 18 including a first seating region 24 and a second seating region 26 which are positioned in a side-by-side relationship adjacent one another upon a floorboard 50. Each seating region 24 or 26 includes a seat portion 28 upon which an occupant of the vehicle can sit and a back portion 32 against which the back of the occupant leans when the occupant is seated upon the seat portion 28. Furthermore, the seat portion 28 of each seating region 24 or 26 includes a forward edge 27, a rearward edge 29 and two opposite (i.e. left and right) sides 31, 33; and the back portion 32 of each seating region 24 or 26 includes a lower edge 35, an upper edge 37 and two opposite (i.e. left and right) sides 39, 41.

Further still, each seat portion 28 includes a forward section 43 which depends downwardly from the forward edge 27 and which is disposed behind, or rearwardly of, the shins of the seat occupant when the occupant is seated upon seat 22. Thus, the height of the forward section 43 corresponds generally with the length of the occupant's shins or, in other words, the length of the occupant's legs as measured between the occupant's knees and the bottom of the occupant's feet.

Extending between the forward edge 27 and the rearward edge 29 of each seating region 24 or 26 is an upper surface 34 which is oriented somewhat parallel to a horizontally-disposed plane or, in the alternative (for comfort), can be canted slightly downwardly as a path is traced from the forward edge 27 toward the rearward edge 29 of the seating region 24 or 26. That is to say, the upper surface 34 can be oriented slightly higher adjacent the forward edge 27 of the seating region 24 or 26 than it is at the rearward edge 29 thereof. Commonly, each seating region 24 or 26 is accompanied by seat belt assembly (not shown) having a buckle portion and a receptacle portion within which the buckle portion is releasably accepted.

Furthermore, the back portion 32 of each seating region 24 or 26 defines a forwardly-facing surface 42 which extends between the lower and upper edges, indicated 35 and 37, respectively, of the back portion 32. The forwardly-facing surface 42 is commonly canted rearwardly (e.g. for comfort) as a path is traced upwardly therealong from the lower edge 35 toward the upper edge 37 thereof. The back portion 32 of each seating region 24 or 26 is commonly accompanied by a head rest assembly 60 having a head rest cushion 62 and a pair of downwardly-depending rods 64 which are adapted to be slidably accepted by upwardly-facing openings 66 (FIG. 2) provided at the top of the back portion 32.

With reference to FIGS. 3 and 4, it is a feature of the depicted accessory 20 that it includes a cushion arrangement 70 which is positionable adjacent one side of the seating region 24 or 26 to provide a barrier or partition between the seating space provided by the seating region 24 or 26 and either the seating space of the adjacent seating region 26 or 24 or an adjacent item, such as the door (not shown) of the vehicle 18 situated to one side of the seating region 24 or 26. In use, the cushion arrangement 70 is removably secured in a stationary condition relative to the seating region 24 or 26 and adjacent one side thereof.

As best shown in FIG. 4, the cushion arrangement 70 of the embodiment 20 includes an L-shaped assembly 72 which includes a back portion 74 which provides one leg of the L of the L-shaped assembly 72 and includes a side portion 76 which provides the other leg of the L of the L-shaped assembly 72. When the cushion arrangement 70 is positioned within its intended position adjacent one side of the seating region 24 or 26, the back portion 74 thereof rests against the forwardly-facing surface 42 of the back portion 32 of the seating region 24 or 26 so as to extend between the lower and upper edges 35 and 37, respectively, of the back portion 32, and the side portion 76 is adapted to rest atop the upper surface 34 of the seating region 24 or 26 adjacent one side thereof so as to extend between the forward and rearward edges 27 and 29, respectively, of the seat portion 28.

Figure 7:
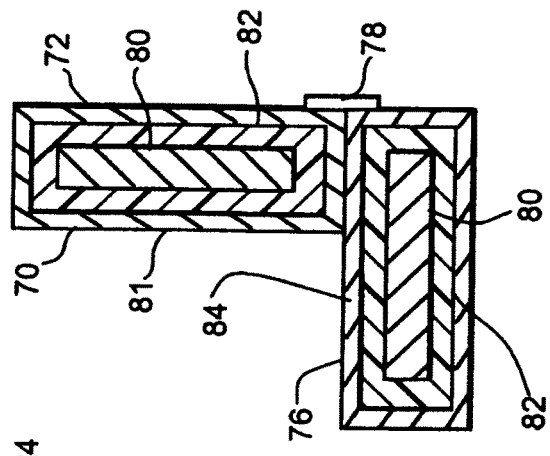
FIG. 7 is a cross-sectional view of the embodiment of FIG. 1 taken along line 7-7 of FIG. 4.
Figure 6:
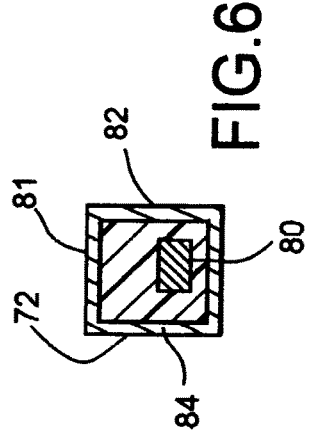
FIG. 6 is a cross-sectional view of the embodiment of FIG. 1 taken along line 6-6 of FIG. 5.

With reference to FIGS. 5-7, each of the back and side portions 74, 76 of the cushion arrangement 70 is substantially rectangular (i.e. square) in transverse cross section and includes a relatively hard inner core 80 constructed, for example, out of wood, an intermediate layer 82 of relatively soft foam material, and an outer skin, or layer 84, of flexible material, such as vinyl or leather, which provides each of the back and side portions 74, 76 with an exterior surface 81. The back and side portions 74, 76 of the assembly 72 of the arrangement 70 are joined together with a flexible hinge 78 (FIG. 4) comprised, for example, of flexible material, such as vinyl or leather, which is secured (e.g. glued or sewn) to the outer layer 84 to accommodate the folding of the assembly 72 into an alternative folded, relatively compact arrangement for storage or shipping.

Although the depicted accessory 20 can be secured to the seating region 24 or 26 in any of a number of ways, the depicted apparatus 20 includes securement means, generally indicated 86, in the form of a pair of straps 90 (best shown in FIG. 8) which are secured to the back portion 74 of the arrangement 70 and adjacent the top thereof for securement of the straps 90 to (e.g. by tying or wrapping the straps 90 about) the rods 66 associated with the head rest assembly 60 of the seating region 24 or 26. In addition, two pairs of wing-like straps 92, 94 are connected at one end to the sides of the back and seat portions 74, 76 of the cushion arrangement 70, and an eyelet 96 is joined to the front of the side portion 76; and these straps 92, 94 and eyelet 96 enable the cushion arrangement 70 to be secured to appropriate hardware associated with the seating region 24 or 26. To the same end, a plurality of eyelets, or open ports 98, are provided in the outer layer 84 of the cushion arrangement 70 adjacent the top, back or side thereof, and a plurality of button snaps 100 are secured to the back side of the back and side portions 74, 76 for securement (in a snap-fit relationship) to appropriate members secured to the seat 22.

If desired and with reference to FIGS. 1, 2 and 4, pockets 102, having zipper closures, can be provided at desirable locations along the length of the cushion arrangement 70, and a circular recess 106 can be formed in the upper surface of the side portion 76 for providing a cup holder therein.

When the accessory 20 is positioned in place adjacent one side of the seating region 24 and 26 in the manner depicted in FIG. 1, an occupant of the seating region 26 or 24 is physically separated from the seating space of the adjacent seating region 24 or 26. This serves the function of physically separating two occupants who are seated in the adjacent seating regions 24 and 26—which may desirable if, for example, the two occupants are disagreeable siblings. Furthermore and if the accessory 20 is positioned in place adjacent a side of the seating region 24 and 26 closest to an adjacent vehicle door, the occupant of the seating region 24 or 26 is physically separated from componentry of the door, such as the door latch, door lock and window controls that may be inadvertently accessed by the occupant. In any event, the side portion 76 of the cushion arrangement 70 provides an arm rest for the occupant of the seating region 24 or 26, and the back portion 74 provides a comfortable surface against which the head of the occupant may rest (the side of) his head.

Figure 9:
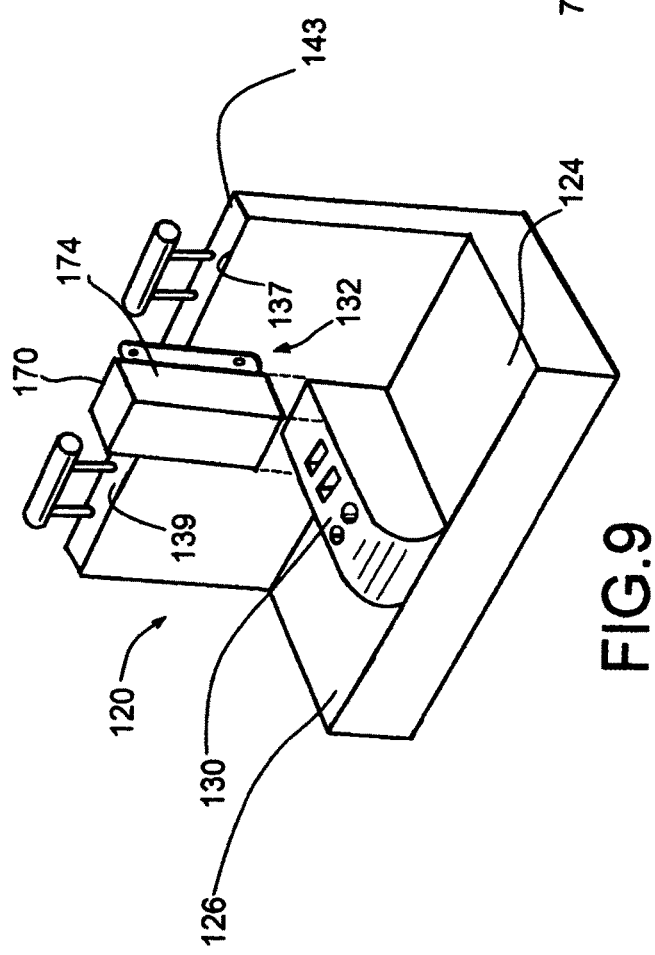
FIG. 9 is a perspective view of an alternative embodiment of an apparatus within which features of the present invention are embodied shown depicted in an environment of intended use, but shown exploded.

With reference to FIG. 9, there is illustrated another embodiment, generally indicated 120, of an apparatus in which features of the present invention are embodied and shown utilized in an exemplary environment of use. Within the FIG. 9 embodiment, there is provided a pair of seating regions 124, 126 which are arranged in a side-by-side relationship and the seating regions 124, 126 are separated by an arm rest 130. Since the seating regions 124, 126 are already separated by the arm rest 130, there is no need for a supplemental, or additional, means to separate the seating regions 124, 126 in the area of the arm rest 130. Consequently, the accessory embodiment 120 includes a cushion arrangement 170 which includes only a back portion 174 and means, generally indicated 132, enabling the back portion 174 to be releasably secured in a stationary condition relative to the seating region 124, 126. As is the back portion 74 of the embodiment 70 of FIGS. 1-8, the back portion 174 of the FIG. 9 apparatus 170 is substantially rectangular (i.e. square) in transverse cross section having a hard inner core, an intermediate layer which surrounds the hard inner core and an outer skin, or layer, of flexible material. In addition, the back portion 174 is of sufficient length to span the distance (i.e. in height) between the upper surface of the arm rest 130 and the upper edge 137 of the seating region 124 or 126 along which the cushion arrangement 170 is secured.

Figure 10:
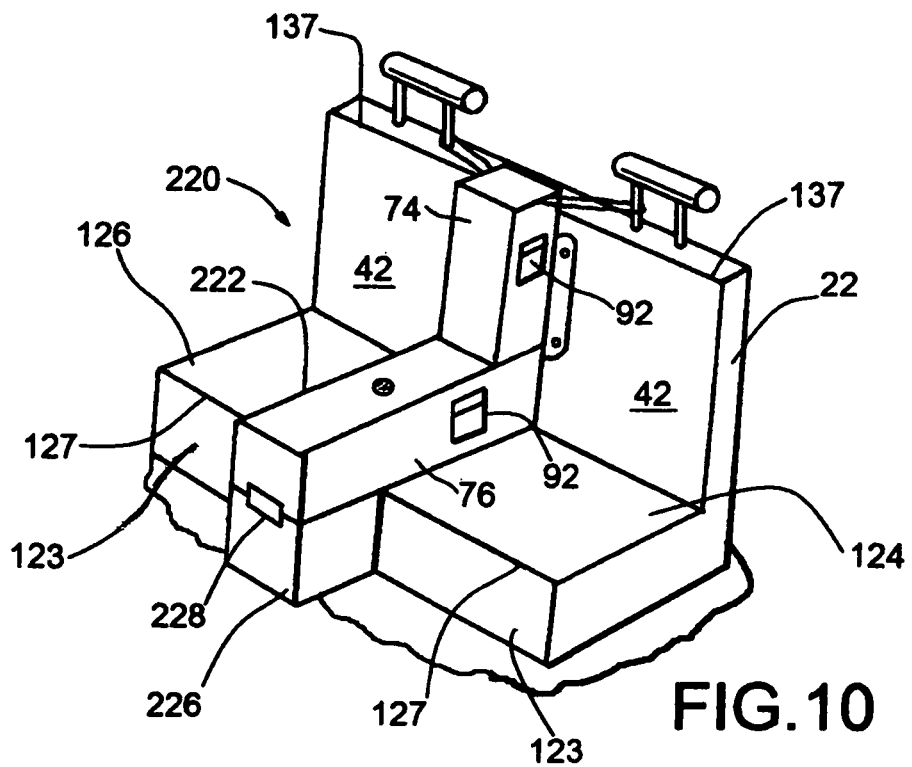
FIG. 10 is a perspective view of one more alternative embodiment of an apparatus with which features of the present invention are embodied shown depicted in an environment of intended use.
Figure 11:
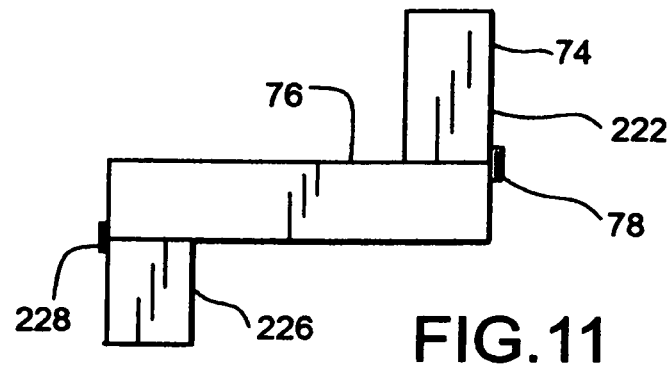
FIG. 11 is an elevation view of the embodiment of FIG. 10 as seen generally from the right in FIG. 10 but showing the relative disposition of the component portions of the FIG. 10 embodiment when positioned in a condition for use.
Figure 12:
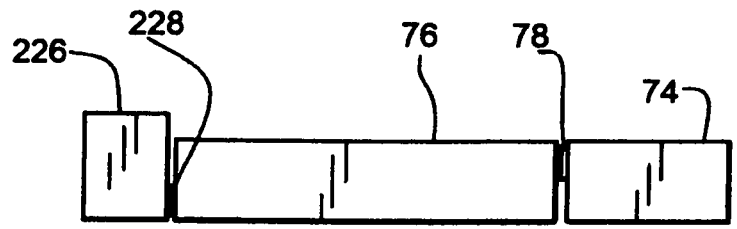
FIG. 12 is an elevation view of the embodiment of FIG. 10 as seen generally from the right in FIG. 10 but showing the relative disposition of the component portions of the FIG. 10 embodiment when positioned in a condition for storage.

With reference to FIGS. 10-12, there is illustrated one more embodiment, generally indicated 220, of an apparatus in which features of the present invention are embodied. In this connection, the embodiment 220 is in the form of a cushion arrangement 222 and includes a first body in the form of a back portion 74, a second body in the form of a side portion 76 and a third body in the form of a forward portion 226 which are hingedly connected together to accommodate hinged movement of these portions 74, 76, 226 between a condition of use (as depicted in FIGS. 10 and 11) and a condition for storage (as depicted in FIG. 12). The back and side portions 74, 76 are identical in construction to the back and side portions 74, 76 of the embodiment 20 of FIGS. 1-8 and accordingly bear the same reference numerals.

Meanwhile, the forward portion 226 of the cushion arrangement 222, as is each of the back and side portions 74, 76 of the arrangement 222, is block-like in form having a transverse cross section which is substantially rectangular (i.e. square) in shape having a relatively hard inner core, an intermediate layer of relatively soft material surrounding the inner core, and an exterior surface 81 comprised of a flexible sheet material which envelopes the material of the intermediate layer. Moreover, the forward portion 226 is hingedly joined to the side portion 76 with a flexible hinge 228 comprised, for example, of flexible material, such as the flexible material comprising the exterior surface 81 of the forward portion 226 and which overlies adjacent corners of the forward and side portions 226, 28.

For securement of the cushion arrangement 222 in a stationary relationship with respect to a seating region 124 or 126, the apparatus 120 can include securement means which are identical to those of the securement means 86 of the embodiment 20 of FIGS. 1-8. That is to say that the apparatus 120 can includes any of a number of straps, snaps and eyelets to facilitate the securement (or tie-down) of the cushion arrangement 222 to appropriate hardware (such as the headrest of the seating region 124 or 126) to thereby secure the cushion arrangement 222 in a stationary condition with respect to the seating region 124 or 126.

When the cushion arrangement 222 is in use and as is depicted in FIG. 10, the back portion 74 rests against the forwardly-facing surface 42 of the back portion 32 of the seat 22, the side portion 76 overlies the seat portion 28 and the forward portion 226 extends downwardly from the forward edge 27 of the seat portion 28. With the cushion arrangement 222 positioned upon a seating region of the seat 22 in such a manner, the forward portion 226 of the arrangement 222 separates a leg, or shin-accepting, region, indicated 123, disposed forwardly of the seat portion of the seating region 124 or 126 from the leg, or shin-accepting, region of an adjacent leg, or shin-accepting, region disposed forwardly of the other seating region 126 or 124 and is advantageous in this respect.

With reference to FIGS. 11 and 12, there is illustrated the relative dispositions of the back portion 74, side portion 76 and forward portion 226 when the cushion arrangement 222 is positioned in a condition for use and a condition for storage. More specifically, there is shown in FIG. 11 the relative dispositions of the back, side and forward portions 74, 76, 226 when the arrangement 220 is unfolded to a condition for use, and there is shown in FIG. 12 the relative dispositions of the back, side and forward portions 74, 76, 226 when the arrangement 222 is unfolded to an alternative shape, or condition, for storage or shipping.

It follows from the foregoing that an apparatus has been described which is positionable alongside a seating region to provide a barrier between the seating region and an adjacent space or an item (or items) disposed adjacent the seating region. In addition, the apparatus includes means, such as can include straps, eyelets or snap buttons, which enable the apparatus to be secured in a stationary condition with respect to the seating region. If desired, the apparatus can act as a partition which protects the occupant of the seating region from leaning upon a vehicle door situated adjacent the seating region in a manner which could cause the door or window associated with the door to be inadvertently opened or a lock associated with the door to be inadvertently locked or unlocked.

Although the aforedescribed apparatus 20, 120 or 220 has been shown and described as being well-suited for use in connection with a vehicle seat, the principles of the apparatus 20 or 120 can be applied to other environments. For example, an apparatus which includes an appropriately-shaped cushion arrangement which can be secured adjacent the seating region of common household furniture (e.g. bed, couch or sofa) or outdoor furniture (e.g. lawn or patio furniture). Accordingly, the principles of the present invention can be variously applied.

It will be understood that numerous modifications and substitutions can be had to the aforedescribed embodiments 20, 120, 220 without departing from the spirit of the invention. Accordingly, the aforedescribed embodiments are intended for the purpose of illustration and not as limitation.

The invention claimed is:
1. An apparatus for use with a seating region having a seat portion and a back portion, and the seat portion includes a forward edge, said apparatus comprising:
    at least one body which is securable in a relatively stationary condition with respect to the seating region for providing a partition adjacent one side of the seating region, wherein the apparatus includes a plurality of bodies which are secured to one another and which are securable to at least one of the seat portion and the back portion of the seating region; and the plurality of bodies are connected to one another to accommodate a hinged movement of the plurality of bodies with respect to one another between a condition for use at which a first body of the plurality of bodies is positionable against the back portion of the seating region while a second body of the plurality of bodies is positioned upon the seat portion of the seating region and an alternative folded condition for storage or shipping; and wherein the plurality of bodies includes a third body which is positioned forwardly of the seat portion and depends downwardly from the forward edge thereof when the plurality of bodies are arranged in the condition of use and the second of the plurality of bodies is positioned upon the seat portion as aforesaid.

2. The apparatus as defined in claim 1 wherein the seating region is a first seating region and is disposed adjacent a second seating portion, and the at least one body is securable to at least one of the seat portion and the back portion of the first seating region for partitioning the first seating region from the second seating region.

3. The apparatus as defined in claim 1 wherein the seating region is disposed adjacent a door, and the at least one body is securable to at least one of the seat portion and the back portion of the seating region for partitioning the seating region from the door.

4. The apparatus as defined in claim 1 wherein the seating region includes an arm rest disposed to one side of the seat portion, and the at least one body is positioned upon the arm rest when the at least one body is secured in a stationary condition with respect to the seating region.

5. The apparatus as defined in claim 1 including a plurality of fasteners which are connected to the at least one body for securement of the at least one body to the seating region to thereby secure the at least one body in a stationary relationship with respect to the seating region.

6. The apparatus as defined in claim 5 wherein the plurality of fasteners includes at least one of a group of fastening items including straps, snaps and eyelets.

7. The apparatus as defined in claim 6 wherein the seating region includes a head rest associated with the back portion of the seating region, and the plurality of fasteners includes straps which are securable to the head rest of the seating region to thereby secure the at least one body in a relatively stationary condition with respect to the seating region.

8. The apparatus as defined in claim 1 wherein the at least one body includes an inner core comprised of a relatively rigid material, an intermediate layer comprised of a relatively soft material which surrounds the inner core and an outer layer comprised of a flexible sheet material which envelopes the intermediate layer.

9. An apparatus for use with a seating region having a seat portion and a back portion and wherein the seat portion has a forward edge and a rearward edge and the back portion has an upper edge and a lower edge, said apparatus comprising:

two cushioned bodies which are hingedly connected together for pivotal movement relative to one another between a condition of use at which one of the two cushioned bodies is positioned upon the seat portion so as to extend between the forward and rearward edges thereof and at which the other of the two cushioned bodies is positioned against the back portion so as to extend between the lower edge and the upper edge thereof and a condition for storage or shipping; and wherein each of the two cushioned bodies defines an exterior surface and includes an inner core constructed of relatively rigid material and an intermediate layer disposed between the inner core and the exterior surface which is constructed of a relatively soft material so that the exterior surface of each of the two cushioned bodies is cushioned by the intermediate layer.

10. The apparatus as defined in claim 9 wherein the relatively rigid material of the inner core includes wood and the relatively soft material of the intermediate layer includes a foam material.

11. The apparatus as defined in claim 9 wherein the exterior surface of each of the two cushioned bodies is provided by a sheet of flexible material, and the two cushioned bodies are hingedly connected together as aforesaid with a piece of the flexible material.

12. The apparatus as defined in claim 9 wherein each of the two cushioned bodies is in the form of a block having a transverse cross section which is substantially rectangular in shape.

13. The apparatus as defined in claim 9 wherein the seating region includes a forward, leg-accepting region which extends forwardly of the seat portion, and the apparatus further includes a third cushioned body which is hingedly connected to the one of the cushioned bodies for hinged movement relative thereto between a condition of use at which the third cushioned body is positioned forwardly of the one of the cushioned bodies and within the forward, leg-accepting region of the seating region and a condition for storage or shipping.

14. The apparatus as defined in claim 9 including a plurality of fasteners which are connected to the cushioned bodies for securement of the cushioned bodies to the seating region to thereby secure the cushioned bodies in a stationary relationship with respect to the seating region.

15. The apparatus as defined in claim 9 wherein the seating region is a first seating region and is disposed adjacent a second seating portion, and the two cushioned bodies are securable to the seat portion and the back portion of the first seating region for partitioning the first seating region from the second seating region.

16. The apparatus as defined in claim 9 wherein the seating region is disposed adjacent a door, and the two cushioned bodies are securable to at least one of the seat portion and the back portion of the seating region for partitioning the seating region from the door.

17. An apparatus for use with a seating region having a seat portion and a back portion and wherein the seat portion has a forward edge and a rearward edge and the back portion has an upper edge and a lower edge and wherein the seating region includes a head rest associated with the back portion of the seating region, said apparatus comprising:

two cushioned bodies which are hingedly connected together for pivotal movement relative to one another between a condition of use at which one of the two cushioned bodies is positioned upon the seat portion so as to extend between the forward and rearward edges thereof and at which the other of the two cushioned bodies is positioned against the back portion so as to extend between the lower edge and the upper edge thereof and a condition for storage or shipping; and the apparatus further includes a plurality of fasteners which are securable to the head rest of the seating region to thereby secure the cushioned bodies in a relatively stationary condition with respect to the seating region.

\* \* \* \* \*